[11] 3,597,702

| [72] | Inventors | Roger Dumanchin<br>Orsay;<br>Jean-Pierre Bettini, Saint Gratien, both of, France |
|---|---|---|
| [21] | Appl. No. | 804,574 |
| [22] | Filed | Mar. 5, 1969 |
| [45] | Patented | Aug. 3, 1971 |
| [73] | Assignee | Compagnie Generale D'Electricite<br>Paris, France |
| [32] | Priority | Mar. 6, 1968 |
| [33] | | France |
| [31] | | 142 631 |

[54] METHOD AND APPARATUS FOR TRIGGERING A SOLID LASER
4 Claims, 5 Drawing Figs.

[52] U.S. Cl. .................................................. 331/94.5, 350/285, 350/286
[51] Int. Cl. .................................................. H01s 3/05
[50] Field of Search ...................................... 331/94.5; 350/286, 174, 285

[56] References Cited
UNITED STATES PATENTS

| 3,315,177 | 4/1967 | Benson .......................... | 331/94.5 |
| 3,414,839 | 12/1968 | Bridges et al. ................ | 356/106 X |
| 3,483,486 | 12/1969 | Sorokin ........................ | 331/94.5 |

*Primary Examiner*—Ronald L. Wibert
*Assistant Examiner*—Edward S. Bauer
*Attorney*—Sughrue, Rothwell, Mion, Zinn and Macpeak ABSTRACT: A process for triggering a laser of a solid bar of active material, consisting of separating the rays emitted from the bar into two beams and rotating each of the beams in opposite directions so as to render them parallel with the optical axis of the cavity at the same time.

METHOD AND APPARATUS FOR TRIGGERING A SOLID LASER

BACKGROUND OF THE INVENTION

The present invention concerns lasers comprising solid active material and more particularly lasers intended to produce very brief light pulses directed with very high angular precision in a given direction. The present invention is useful for many practical applications, more particularly in the applications of lasers to telemetry.

The present invention concerns a device for the external triggering of a laser comprising solid active material, which is distinguished notably by the fact that the light rays issuing from the active rod are divided into two beams, and that these beams are subjected to a rotation towards one another. The parallelism of the two beams corresponds to the production of the maximum quality factor of the optical cavity in which the active material is situated.

Various means are known for producing a rapid variation of the quality factor of an optical cavity; generally, this optical cavity is formed of two reflecting faces, one of which consists of a mirror having a transmission coefficient other than zero, while the other consists of a rotating totally reflecting surface.

This rotating surface could consist of a mirror, however, this is impractical because reflecting layers disposed on vitreous plates cannot withstand high luminous powers without damage. Therefore, it is preferable to employ a totally reflecting prism which rotates about an axis perpendicular to its edge.

Figure 1:
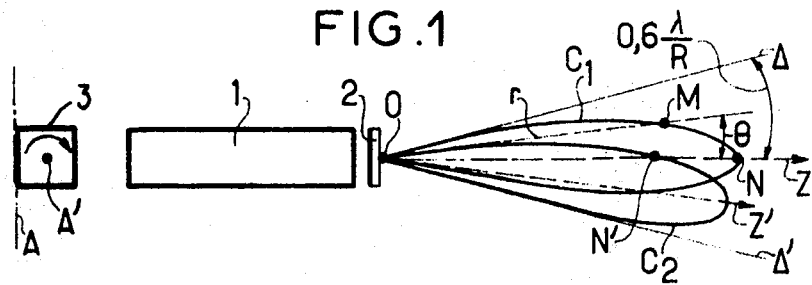

Such a system is diagrammatically illustrated in FIG. 1. An active rod 1 is disposed in a cavity formed of a plate 2 having a certain transmission coefficient. A prism 3 rotates about an axis A' perpendicular to the edge A. Such a triggering system has a number of disadvantages, the main ones of which are the existence of faults in the distribution of light due to the edge A and the existence of an entrainment of the issuing beam in the direction of rotation of the prism. On the right-hand part of FIG. 1, there is shown the distribution curve of the energy of the issuing beam as a function of its direction. The curve $C_1$ corresponds to the theoretical distribution, while curve $C_2$ is that obtained in practice when a rotating prism such as that shown at 3 is used.

On the curve $C_1$, the length of the segment OM represents the value of the energy radiated in the direction defined by the angle $\theta$. The curves $C_1$ and $C_2$ are tangent to the straight lines $\Delta$ and $\Delta'$, of which the half-angle is theoretically equal to 0.6 $\lambda/R$, R being the radius of the active surface of the outlet mirror 2 and $\lambda$ being the wavelength of the light beam.

In order to be able to effect accurate sightings with the laser beam, it is important to relate the direction defining the maximum energy to the optical axis of the laser. The ideal case is that in which the optical axis OZ of the laser is identical with the axis off the distribution curve. In practice, the rotation of the prism produces an entrainment of the issuing beam, t the energy distribution curve of this beam then has for its axis a direction OZ' different from OZ, the angle ZOZ' being essentially a function of the speed of rotation of the prism and of the applied pump energy. On the other hand, an increase in the speed of the prism has the effect of slightly lengthening the distribution curve, because an approximation to the ideal case of ultrarapid switching is thereby obtained. In the case where the curve is entrained, there is collected on the optical axis OZ an energy whose value, represented by the segment ON', is lower than the energy obtained in the ideal case (represented by the length of the segment ON).

In order to obviate the aforesaid disadvantages, the present invention proposes to modulate the quality factor of the optical cavity by dividing the light beam into two parts, which parts undergo entrainments in opposite directions.

Figure 2:
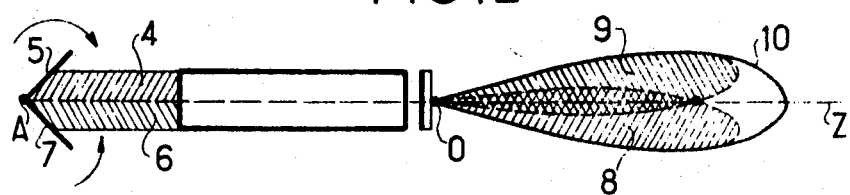

The method according to the invention is diagrammatically illustrated in FIG. 2.

The beam of the laser is divided into two parts. One of the parts 4, for example, is reflected by a reflecting surface 5 rotating about the axis A. The other part 6 is reflected on a reflecting surface 7 rotating about the same axis 4, but in the opposite direction. Therefore, two lobes are obtained at the outlet from the laser, the lobe 8 corresponding to the beam part 4 and the lobe 9 corresponding to the beam 6. Each of the two lobes is offset in relation to the axis OZ of the laser. Assuming that the movement of the reflecting surfaces is very rapid and is completely synchronized, there is obtained at the outlet of the laser a resultant distribution curve represented by the lobe 10.

This lobe 10 is symmetrical about the axis OZ, thus one of the aforesaid disadvantages is obviated. However, it is impossible in practice to produce "hinged" mirrors such as that shown in FIG. half-beams and it is impossible to subject them to rapid and completely synchronized opposite rotations which are necessary half-beams producing a high-energy laser pulse.

In accordance with the present invention, the triggering of the laser comprising solid active material is effected by rotating two half-beams towards one another with the aid of a single reflecting surface.

In accordance with the present invention, the light beam passing through the active material is divided into two beams by means of static prisms and which beams are caused to meet on a plane reflecting surface capable of being rotated.

Figure 3:
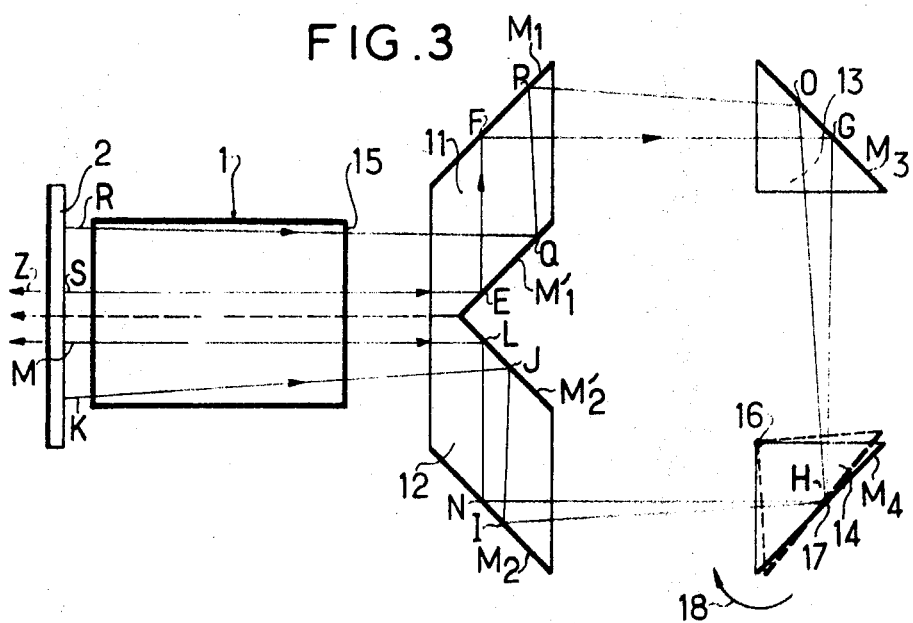
Figure 4:
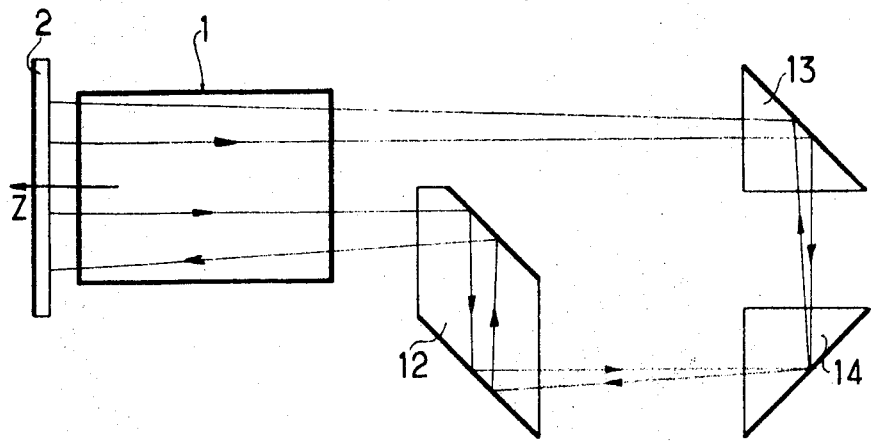

FIGS. 3 and 4 diagrammatically illustrate two practical embodiments employing the method according to the present invention.

In FIG. 3, there will be seen a laser formed of an active rod 1 disposed in an optical cavity formed on one side by a mirror 2 having a transmission power other than zero, which defines the outlet face of the laser, and on the other side of a triggering device according to the invention. This triggering device is formed of four prisms 11, 12, 13, and 14, respectively.

The prisms 11 and 12 each comprise two reflecting surfaces $M_1$, $M'_1$ and $M_2$, $M'_2$ respectively. The prisms 13 and 14 are totally reflecting prisms, for example the prism 14, is a prism rotated about an axis which may be that of the edge 16, but which will preferably be an axis 17 in the plane $M_4$.

If the prism 14 is in the position as illustrated in the broken lines in FIG. 3, a ray S emanating from the upper part of the rod 1 will follow the broken line E F G H I J K. A rotation of the plane $M_4$ in the direction indicated by the arrow 18 will have the effect of moving the ray JK towards the ray LM corresponding to the maximum quality factor of the optical cavity. The same is the case with a ray emanating from the lower part of the rod 1; the ray M will follow the path L N H O P Q R and the rotation of the plane $M_4$ will cause the ray QR to move towards the ray SE. Thus, the rotation causes rays QR and JK to move towards one another and these rays will be absolutely parallel to the optical axis Z of the laser at the same instant. It will thus be seen that the device illustrated in FIG. 3 produces the operation schematically described with reference to FIG. 2.

FIG. 4 illustrates a variation of the device according to FIG. 3. The device of FIG. 3 is distinguished by the fact that the prism 11 has been omitted and the prism 13 has been disposed directly in prolongation of the light rays issuing from the upper part of the rod 1.

The device illustrated in FIGS. 3 and 4 is extremely useful because of the fact that it obviates the necessity to use the edge of a rotating prism (FIG. 1) and the rotation of two half-beams in opposite directions is effected by rotation of a single plane reflecting surface. This ensures that the half-beams are parallel to the optical axis of the laser exactly at the same instant, thus the effects of entrainment of the beam are eliminated.

The advantages thus obtained are useful in all cases, however, they acquire greater importance in the case of the use of the laser in telemetry where it is necessary to define the axis of the beam with precision. In a device according to the invention, the axis of the beam is absolutely identical with the optical axis of the laser, while in the case of most lasers not only are the axes not coincident, but the angle of these axes is a function of the speed of rotation of the triggering prism and of the energy emitted by the laser.

Figure 5:
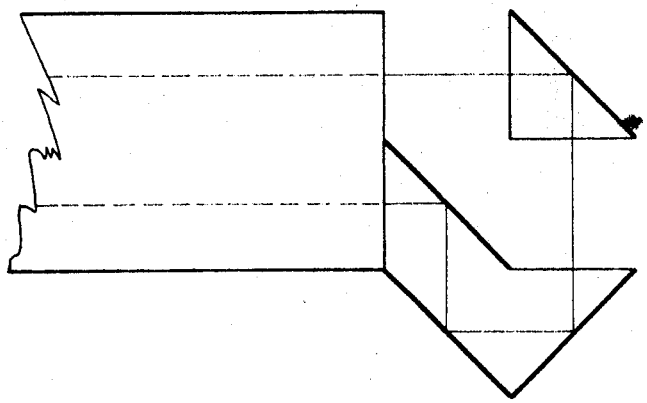

Many modifications may be made to the forms of construction of the device according to the invention. For example, in the case of FIG. 1, the rotating prism may be the prism 13, while the prisms 12 and 14 may be integrally formed, as illustrated in FIG. 5.

The same is the case in FIG. 3, in which the prisms 11 and 13 are combined to form a complex prism cut from a common crystal.

The invention is in no way limited to the embodiment described and illustrated, which has been referred to only by way of example. More particularly, modifications may be made in details, certain features may be changed and certain means may be replaced by equivalent means without departing from the scope of the invention.

What we claim is:

1. A triggered laser generator for supplying a beam which has a symmetrical energy distribution pattern about a precisely defined plane, comprising:

an active laser rod having an axis and being situated in an optical cavity, means for separating the rays emanating from said active laser rod into two beams situated respectively on either side of said plane which contains the axis of said rod, and said optical cavity having means for subjecting each of said beams to a rotation in opposite directions toward one another so as to render them parallel with said axis at exactly the same time.

2. The laser generator as claimed in claim 1, wherein a first set of reflecting surfaces separates the rays issuing from one end face of said rod into said two beams, another set of reflecting surfaces, operatively arranged with said first set of reflecting surfaces for injecting said beams into a portion of said rod end face which is on the opposite side of said plane from which they issued, and said means for subjecting each of said beams to a rotation in opposite directions comprises means for rotating at least one of said reflecting surfaces.

3. The laser generator as claimed in claim 1, wherein a pair of reflecting surfaces separates said rays issuing from one end face of said active rod into said two beams and wherein a circuit formed of four reflecting surfaces disposed in the form of a quadrilateral is operatively positioned with respect to said reflecting surfaces for receiving said beams and wherein one of said four surfaces constitutes a reflecting surface given n rotational movement.

4. The laser generator as claimed in claim 1, wherein a first reflecting surface deflects the rays issuing from a portion of one end face of said active rod and three other reflecting surfaces are operatively disposed to directly inject said rays into another portion of said one end face, at least one of said other reflecting surfaces being formed by a reflecting member given rotational movement.